United States Patent
Fang et al.

(10) Patent No.: US 7,173,742 B2
(45) Date of Patent: Feb. 6, 2007

(54) DOCUMENT SCANNER WITH LIGHT FOCUSING DEVICE

(76) Inventors: Po-Hua Fang, No.1-1, R&D Rd., Science-based Industrial Park, Hsinchu (TW); Shu-Ya Chiang, No.1-1, R&D Rd., Science-based Industrial Park, Hsinchu (TW)

(*) Notice: Subject to any disclaimer, the term of this patent is extended or adjusted under 35 U.S.C. 154(b) by 823 days.

(21) Appl. No.: 10/227,849

(22) Filed: Aug. 27, 2002

(65) Prior Publication Data
US 2004/0042052 A1  Mar. 4, 2004

(51) Int. Cl.
*H04N 1/04* (2006.01)

(52) U.S. Cl. ............... 358/475; 358/474; 358/484; 358/496; 399/379

(58) Field of Classification Search .......... 358/475, 358/497, 494, 474, 509, 505, 506, 487, 473, 358/472, 496, 484; 382/312, 313, 318, 319; 250/234–236, 216, 203.2; 399/221, 220, 399/218, 379, 380, 211, 212
See application file for complete search history.

(56) References Cited

U.S. PATENT DOCUMENTS

| | | | | | |
|---|---|---|---|---|---|
| 4,812,917 | A | * | 3/1989 | Suzuki | 358/451 |
| 5,078,497 | A | * | 1/1992 | Borton et al. | 356/446 |
| 5,083,161 | A | * | 1/1992 | Borton et al. | 399/49 |
| 5,175,422 | A | * | 12/1992 | Koizumi et al. | 235/472.01 |
| 5,525,790 | A | * | 6/1996 | Koizumi et al. | 235/472.01 |
| 5,777,321 | A | * | 7/1998 | Kerschner et al. | 250/235 |
| 5,995,243 | A | * | 11/1999 | Kerschner et al. | 358/461 |
| 6,064,496 | A | * | 5/2000 | Kerschner et al. | 358/471 |
| 6,109,527 | A | * | 8/2000 | Koizumi et al. | 235/472.01 |
| 6,115,184 | A | * | 9/2000 | Hubble et al. | 359/627 |
| 6,462,821 | B1 | * | 10/2002 | Borton et al. | 356/446 |
| 6,674,991 | B2 | * | 1/2004 | Makino et al. | 399/374 |
| 6,801,345 | B1 | * | 10/2004 | Imamura | 358/509 |

* cited by examiner

*Primary Examiner*—Cheukfan Lee
(74) *Attorney, Agent, or Firm*—Berkeley Law & Technology Group LLC

(57) ABSTRACT

A document scanner with a light focusing device downward formed on a document support panel is disclosed. The document scanner is provided with a chassis including a light source and an image sensing device. A scanning window made of light-transmitting material is formed in an area of the document support panel. A driving roller is arranged in a document feeder for driving a document to be scanned through the scanning window. Light emitted from the light source transmits through the scanning window toward the document and is reflected by the document toward the image sensing device. The document support panel forms a convex projection on a bottom surface thereof. The projection confronts the light source for focusing the light onto the document. Preferably, the projection includes an extended section from the bottom surface of the document support panel and forming a convex end surface confronting the light source. A light collecting rim is further downward formed on the document support panel and around the extended section in a direction toward the light source.

12 Claims, 6 Drawing Sheets

DOCUMENT SCANNER WITH LIGHT FOCUSING DEVICE

BACKGROUND OF THE INVENTION

1. Field of the Invention

The present invention relates generally to a document scanner having automatic document feeder, and in particular to a document scanner with a light focusing device downward formed on the top glass panel of the scanner casing of the document scanner.

2. Description of the Prior Art

Document scanners are widely used to form image based electronic files of documents. The document scanners are generally categorized as reflective type and transmissive type. A typical reflective document scanner comprises a chassis arranged inside a scanner casing. The chassis comprises a light source projecting light onto a document to be scanned. The light is reflected by the document that is being scanned and received by an image sensing device. The image sensing device receives the reflected light and forms an image of the document. A typical example of the image sensing device is a Charge Coupling Device (CCD). The reflective document scanners are generally employed to scan document printed on a substrate that is not light transmitting.

The scanner casing of the document scanner comprises a light-transmitting top glass panel on which the document to be scanned can be positioned. A non-light-transmitting cover is mounted to the scanner casing for selectively covering the top glass panel. In a scanning operation, the chassis is moved in a predetermined direction in a controlled manner. The light emitting from the light source is projected onto the document and then reflected back to the image sensing device whereby an image of the document is read by the image sensing device.

Some of the document scanners are equipped with a document feeder. FIGS. 1–3 of the attached drawings show an example of the document scanners that are equipped with a document feeder. As shown in FIGS. 1–3, the document scanner comprises a scanner casing 1 having a top panel 11 partly constituted by a light transmitting top glass panel 12. A document feeder 2 is mounted on and covering the top panel 12, as well as the light transmitting top glass panel 12, of the scanner casing 1.

The document feeder 2 comprises a casing (not labeled) inside which a driving roller 21 is rotatably mounted. A document passage 22 is defined around the roller 21. Inlet and outlet openings I and II are defined in the casing of the document feeder 2 through which a document 3 to be scanned is fed into and out of the document feeder 2. The document 3 that is fed into the document feeder 2 is driven by the roller 21 to move through the passage 22 from the inlet opening I toward the outlet opening II. The document feeder 2 has a bottom panel 20 in which a scanning window 23 is formed.

Also referring to FIG. 4, the document scanner comprises a chassis 13 comprising a light source 14 and an image sensing device 15, such as a Charge Coupling Device (CCD). When the document 3 is fed through the document feeder 2, a light 4 emitted from the light source 14 is projected onto the document 3 through the light-transmitting top glass panel 12 and the scanning window 23. The light is reflected by the document 3 and received by the image sensing device 15. An image of the document is thus formed by the image sensing device 15.

Conventionally, the light-transmitting top glass panel 12 is a flat board having opposite surfaces that are substantially planar. Such a flat board allows light to transmit therethrough. However, the flat board is not capable to more effectively focus the light onto the document 3 to improve the scanning result. Conventionally, the issue is addressed by increasing the power of the light source or incorporating additional reflectors inside the scanner casing of the document scanner to improve the scanning result. Such solutions, although effective in improving scanning result, increase costs by either consuming more power or requiring additional parts.

It is thus desired to provide a document scanner having light focusing device for overcoming the above problems.

SUMMARY OF THE INVENTION

An object of the present invention is to provide a document scanner incorporating a light focusing device.

Another object of the present invention is to provide a document scanner comprising a convex lens formed on a light-transmitting top glass panel of a scanner casing of the document scanner for effectively focusing light onto a document to be scanned so as to enhance scanning result of the document scanner.

A further object of the present invention is to provide a document scanner comprising a light focusing device that comprises light collecting rims for effectively concentrating light emitted from a light source toward a document to be scanned so as to enhance scanning result of the document scanner.

To achieve the above objects, in accordance with the present invention, there is provided a document scanner with a light focusing device downward formed on a top glass panel of the scanner casing. The document scanner is provided with a chassis including a light source for emitting a light and an image sensing device. A document feeder provided with a scanning window is positioned on the top glass panel of the document scanner. A driving roller is arranged in the document feeder for driving a document to be scanned through the scanning window. Light emitted from the light source transmits through the top glass panel of the scanner casing and the scanning window of the document feeder toward the document and is reflected by the document toward the image sensing device. The top glass panel forms a convex projection on a bottom surface thereof. The projection confronts the light source for focusing the light onto the document. Preferably, the projection includes an extended section from the bottom surface of the top glass panel and forming a convex end surface confronting the light source. A light collecting rim is further downward formed on the top glass panel and around the extended section in a direction toward the light source.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
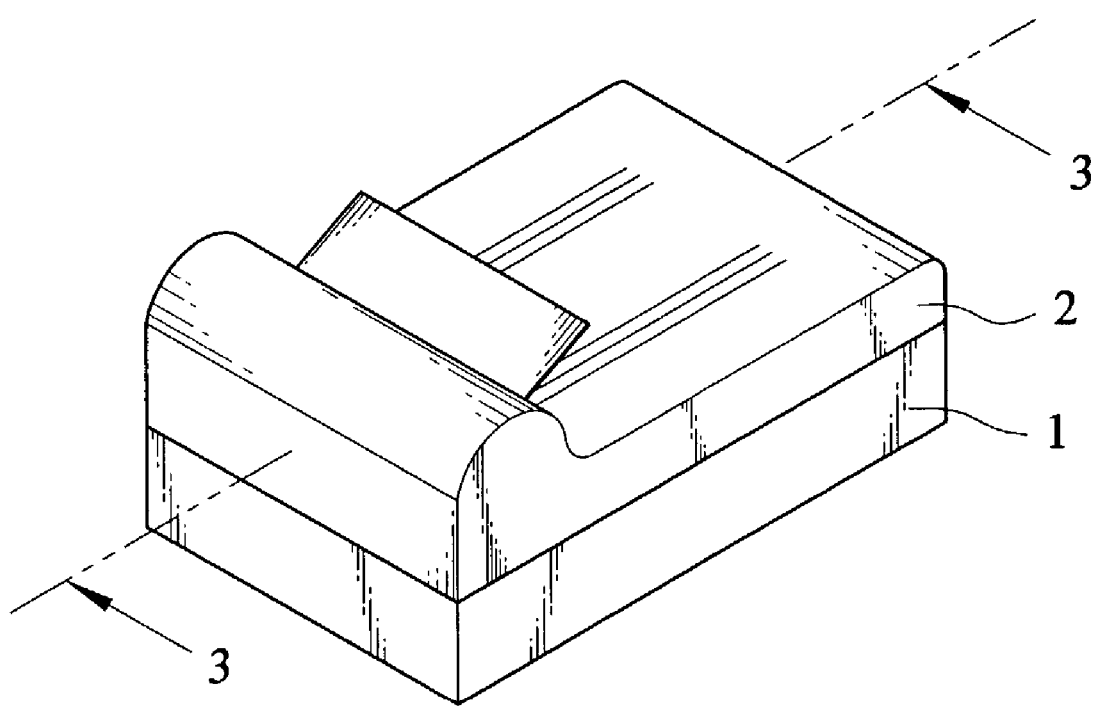
FIG. 1 is a perspective view of a conventional document scanner having a document feeder.
Figure 2:
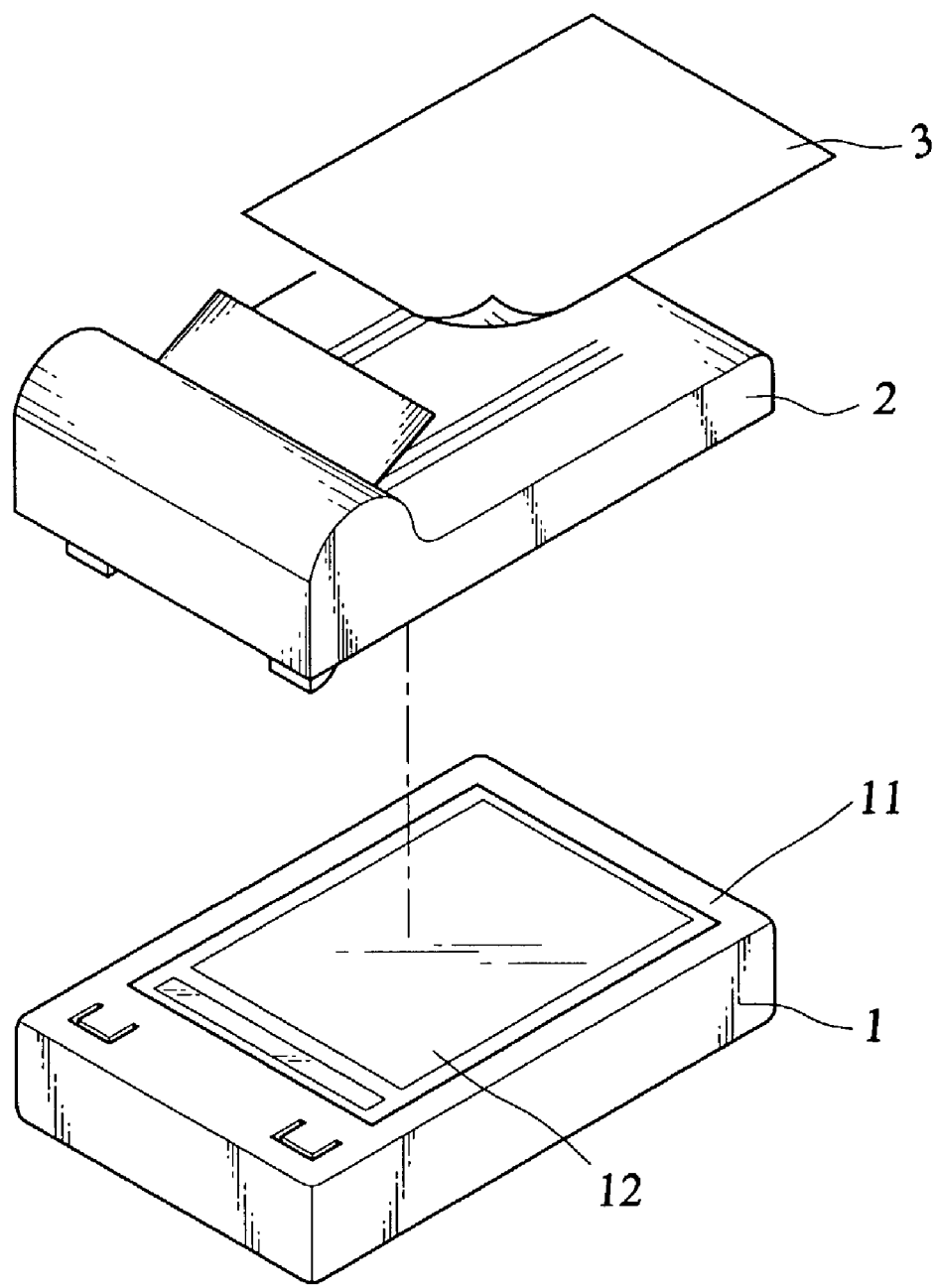
FIG. 2 is a perspective view of the conventional document scanner.

It is to be noted before a description of the preferred embodiments of the present invention is given that a document scanner constructed in accordance with the present invention has a general structure similar to that of a conventional document scanner shown in FIGS. 1–4. Thus, most of the parts of the document scanner that are identical or corresponding to those of the conventional document scanner will not be described again hereinafter for simplicity. However, in order to provide a clear description of the present invention, when necessary, parts of the conventional document scanner may be incorporated in the following description and such parts will bear the same reference numerals as shown in FIGS. 1–4 for simplicity of the description.

Figure 3:
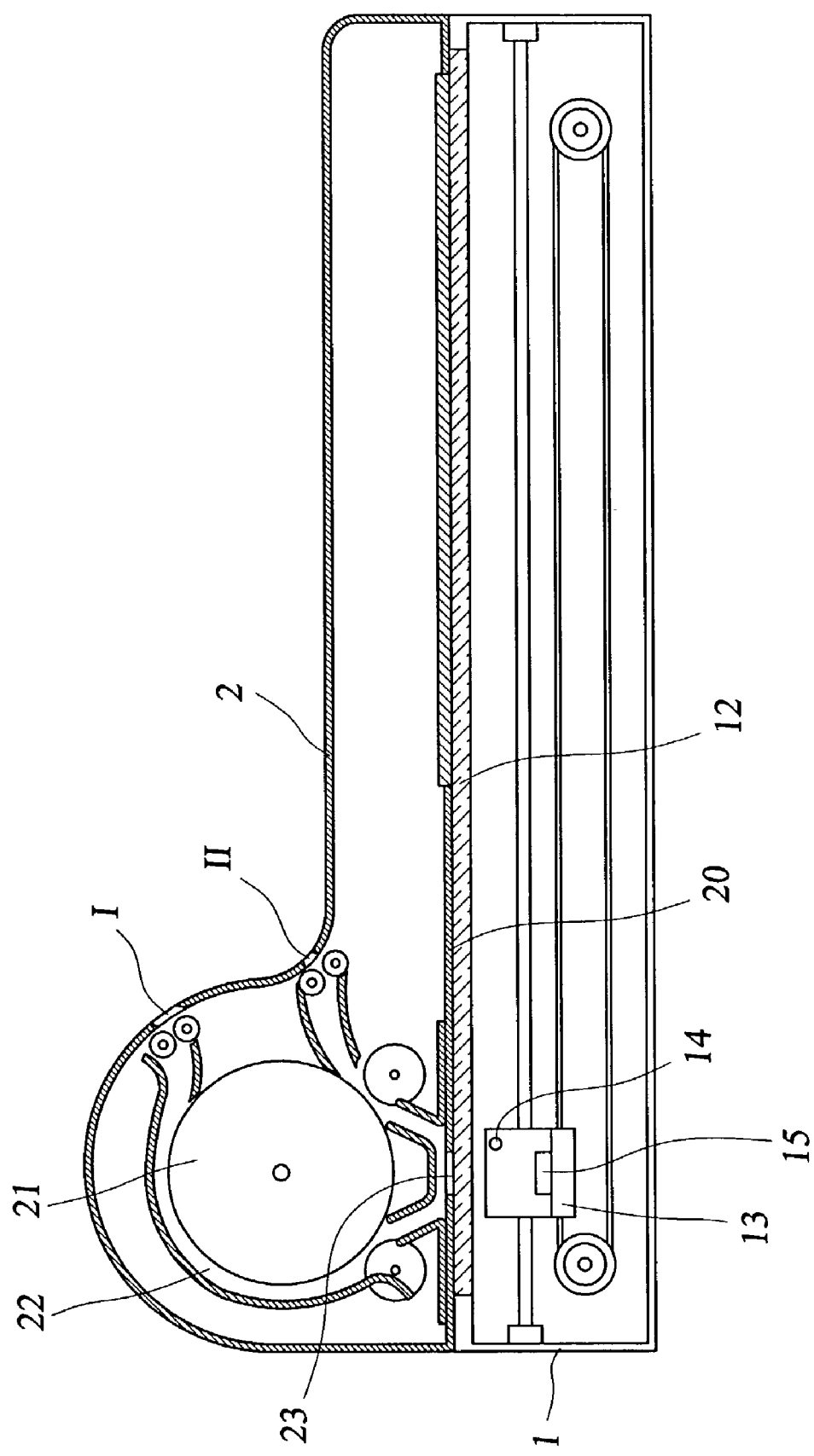
FIG. 3 is a cross-sectional view of the conventional document scanner taken along line A—A of FIG. 1.
Figure 4:
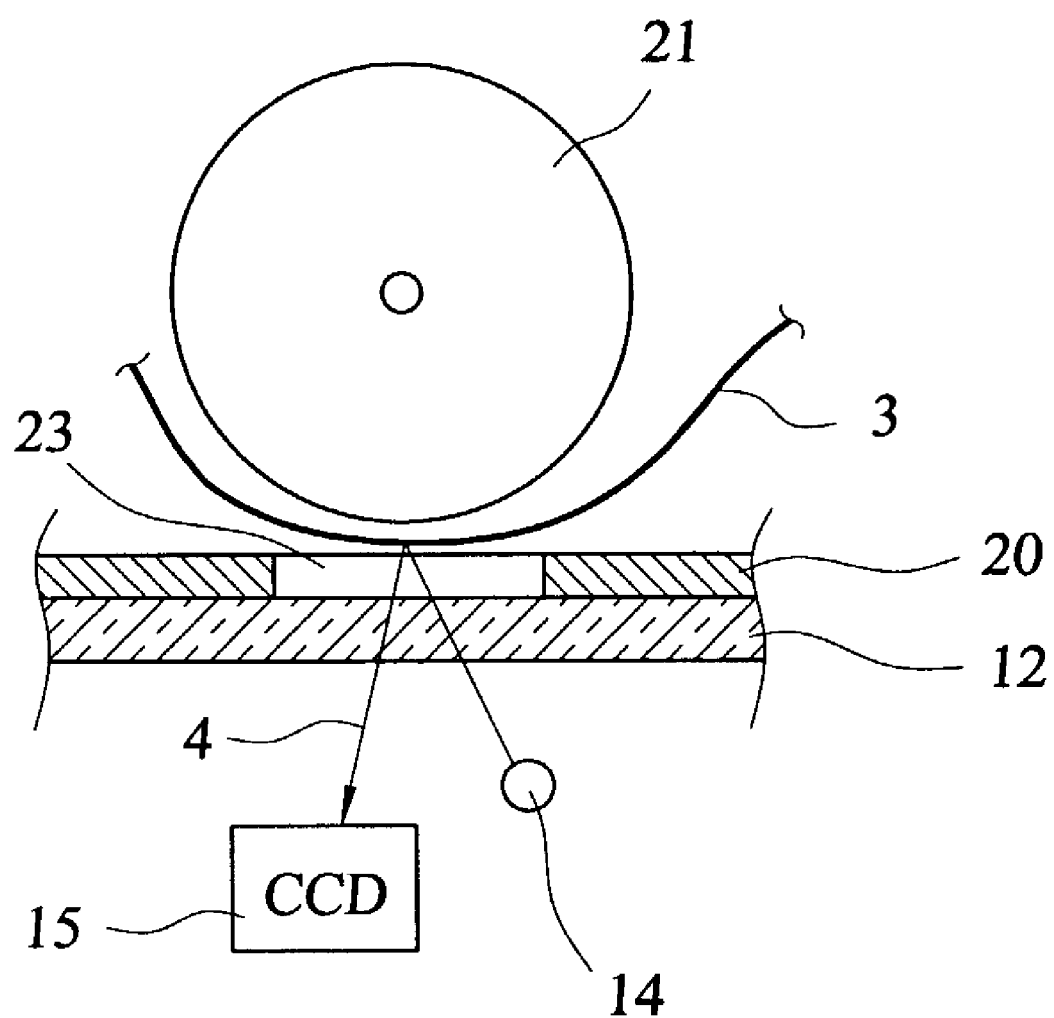
FIG. 4 is a schematic view of a portion of the conventional document scanner for illustrating the scanning operation performed by the conventional document scanner.
Figure 5:
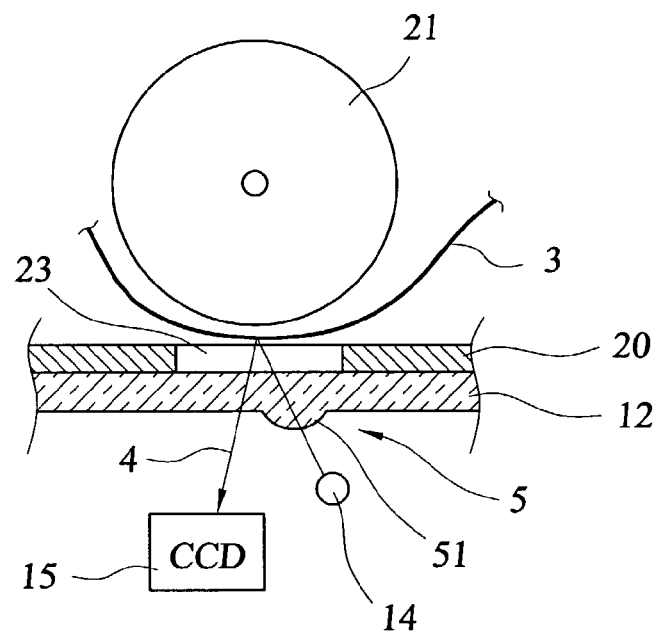
FIG. 5 is a schematic view similar to FIG. 4 but showing a first embodiment of a document scanner constructed in accordance with the present invention.

With reference to the drawings FIGS. 3–5 and in particular to FIG. 5, a document scanner constructed in accordance with a first embodiment of the present invention comprises a scanner frame or casing 1 having a top glass panel 12 that is made of a light-transmitting material to allow light to transmit therethrough and a document feeder 2 having a bottom panel 20 selectively positioned on the top glass panel 12 of the scanner casing 1. A scanning window 23 is defined in the bottom panel 20 of the document feeder 2. The document feeder 2 generally comprises a driving roller 21 for driving a document 3 to be scanned through the scanning window 23.

A chassis 13 is arranged inside the scanner casing 1 of the document scanner. The chassis 13 comprises a light source 14 that is selectively activated to project a light beam 4 through both the top glass panel 12 and the scanning window 23 toward the document 3 and an image sensing device 15, which may be a known Charge Coupling Device (CCD), for receiving the reflected light beam 4 from the document 3.

In accordance with the present invention, a light focusing device 5 is includes in the document scanner of the present invention. The light focusing device 5 in the embodiment illustrated comprises a projection 51 formed on a bottom surface of the top glass panel 12 and confronting the light source 14. The top glass panel 12 may be substantially planar in shape. The projection 51 has a convex configuration, made as a convex lens for focusing or concentrating the light 4 from the light source 14 onto the document 3. In a preferred embodiment of the present invention, the projection 51 is integrally formed with the top glass panel 12. However, it is apparent to those having ordinary skills to make the convex lens separate from the top glass panel 12.

Figure 6:
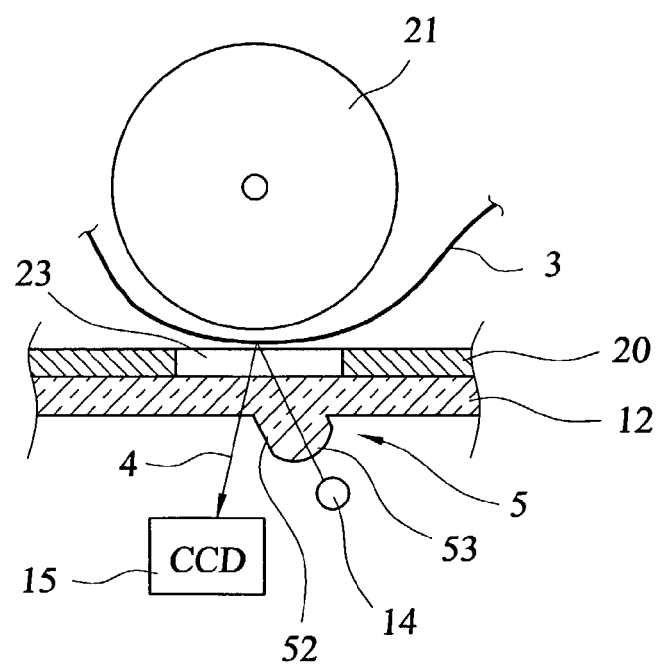
FIG. 6 is a schematic view similar to FIG. 5 but showing a second embodiment of the document scanner constructed in accordance with the present invention.

FIG. 6 shows a second embodiment of the document scanner in accordance with the present invention. The document scanner of the second embodiment is substantially similar to the first embodiment discussed with reference to FIG. 5 except that the light focusing device 5 further comprises an extended section 52 extending from the bottom surface of the top glass panel 12 toward the source 14. The ton glass panel 12 may be substantially planar in shape. The extended section 52 forms a convex projection 53 confronting the light source 14 to function as a convex lens that focuses the light 4 from the light source 14 onto the document 3. The extended section 52 is made toward the light source 14 and guiding the light 4 generated by the light source 14 in a direction toward the document 3.

Figure 7:
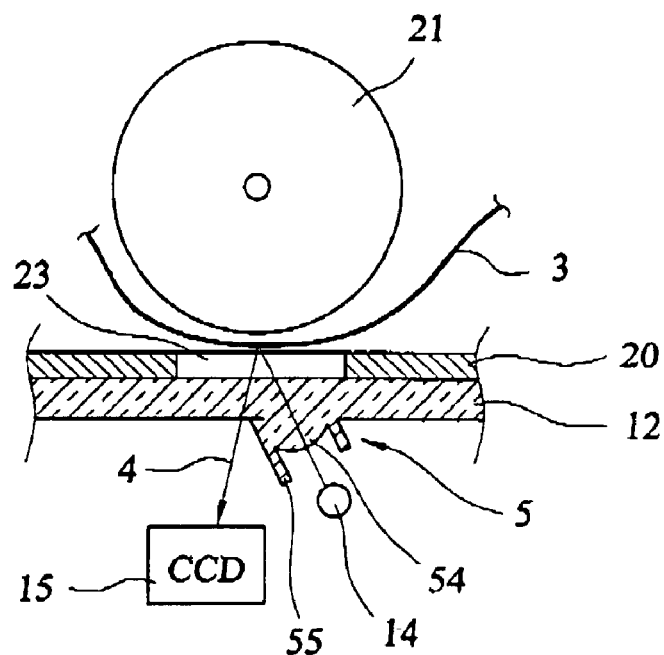
FIG. 7 is a schematic view similar to FIG. 6 but showing a third embodiment of the document scanner constructed in accordance with the present invention.

FIG. 7 shows a third embodiment of the document scanner in accordance with the present invention. The third embodiment is substantially similar to the second embodiment shown in FIG. 6. The light focusing device 5 of the third embodiment comprises an extended section (not labeled) extending from the bottom surface of the top glass panel 12 toward the light source 14 and forming a convex end surface 54 confronting the light source 14 for focusing and guiding the light 4 onto the document 3. The top glass panel 12 may be substantially planar in shape. A light collecting rim 55 is further downward formed around the light focusing device 5 for collecting and concentrating the light 4 generated by the light source 14 in a direction toward the light source 14.

Figure 8:
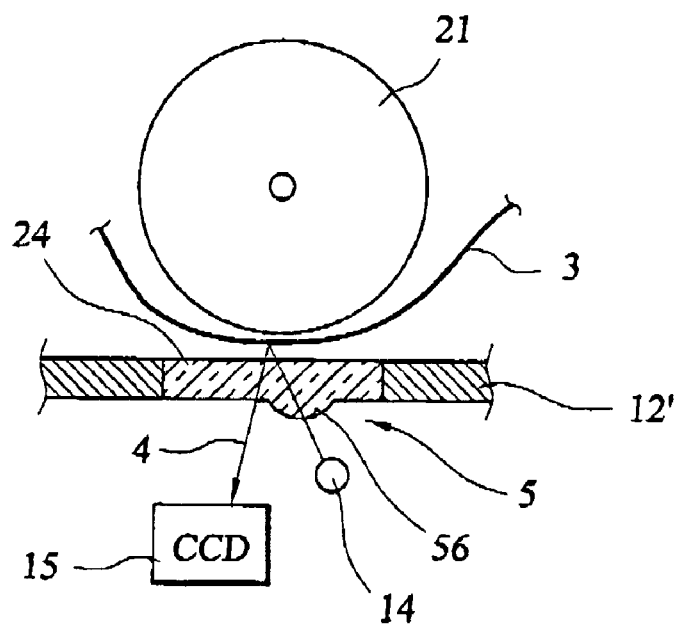
FIG. 8 is a schematic view similar to FIG. 5 but showing a fourth embodiment of the document scanner constructed in accordance with the present invention.

FIG. 8 shows a fourth embodiment of the document scanner in accordance with the present invention. The fourth embodiment is substantially similar to the first embodiment shown in FIG. 5. In the fourth embodiment, a partition or wall 12' is provided between the light source 14 and the document 3 to be scanned. The wall 12' forms a scanning window 24 made of light-transmitting material through which a scanning light 4 emitted from the light source 14 passes. The wall 12' may be substantially planar in shape. A light focusing device 5 comprising a projection 56 having an arcuate convex configuration, made as a convex lens for focusing or concentrating the light 4 from the light source 14 onto the document 3, is formed on the bottom surface of the scanning window 24. The scanner comprises a driving roller 21 arranged above the scanning window 24 (and thus the wall 12') and opposite to the light source 14. A document passage (not labeled) is formed between the roller 21 and the wall 12' for transmission of the document 3 therethrough. When the document 3 is sent through the passage, the light 4 from the light source 14 is focused and concentrated by the focusing device 5 onto the document 3 and then reflected by the document 3 toward a Charge Coupled Device (CCD) 15 for forming an image of the document thereon. When the document 3 is sent through the passage, the light 4 from the light source 14 is focused and concentrated by the focusing device 5 onto the document 3 and then reflected by the document 3 toward a Charge Coupled Device (CCD) 15 for forming an image of the document thereon.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A document scanner comprising:
   a scanner casing comprising a glass panel, the glass panel being substantially planar;
   a document feeder comprising a panel selectively positioned on the glass panel of the scanner casing, a scanning window being formed on the panel of the document feeder, the document feeder capable of feeding a document to be scanned through the scanning window;

a chassis arranged inside the scanner casing, the chassis comprising a light source capable of emitting a light and an image sensing device capable of receiving a reflection of the light transmitted from the light source; and a light focusing device downwardly formed on the glass panel with respect to the light source of the chassis and capable of focusing the light from the light source onto the document.

2. The document scanner as claimed in claim 1, wherein the light focusing device comprises a convex projection integrally formed with the glass panel.

3. The document scanner as claimed in claim 1, wherein the light focusing device comprises: a downwardly extended section integrally formed on the glass panel toward the light source, comprising an end; and a convex projection integrally formed on the end of the extended section, comprising a convex end surface confronting the light source.

4. The document scanner as claimed in claim 1, wherein the light focusing device comprises: a downwardly extended section integrally formed on the glass panel toward the light source, comprising an end; a convex projection integrally formed on the end of the extended section, comprising a convex end surface confronting the light source; and a light collecting rim downwardly formed on the glass panel and around the extended section in a direction toward the light source.

5. A document scanner comprising:
a document support panel comprising a first surface and a second surface, the document support panel being substantially planar;
a scanning window made of light-transmitting material and formed in an area of the document support panel; and
a light focusing device downwardly formed on the first surface of the document support panel and located in the area of the scanning window, capable of focusing a light emitted from a light source through the scanning window onto a document on the second surface of the document support panel.

6. The document scanner as claimed in claim 5, wherein the light focusing device comprises a convex projection integrally formed with the document support panel.

7. The document scanner as claimed in claim 5, wherein the light focusing device comprises: a downwardly extended section integrally formed on the scanning window toward the light source, comprising an end; and a convex projection integrally formed on the end of the extended section, comprising a convex end surface confronting the light source.

8. The document scanner as claimed in claim 7, wherein the light focusing device comprises: a downwardly extended section integrally formed on the scanning window toward the light source, comprising an end; a convex projection integrally formed on the end of the extended section, comprising a convex end surface confronting the light source; and a light collecting rim downwardly formed on the scanning window and around the extended section in a direction toward the light source.

9. An apparatus, comprising:
a wall located between a light source and a document to be scanned;
a scanning window located within the wall, the scanning window capable of allowing light to transmit therethrough, the scanning window being substantially planar and comprising a first surface and a second surface; and
a light focusing device downwardly formed on the first surface of the scanning window, the light focusing device capable of focusing a light emitted from the light source through the scanning window onto the document.

10. The apparatus of claim 9, wherein the light focusing device comprises a convex projection integrally formed with the scanning window.

11. The apparatus of claim 9, wherein the light focusing device comprises: a downwardly extended section integrally formed on the scanning window toward the light source, comprising an end; and a convex projection integrally formed on the end of the extended section, comprising a convex end surface confronting the light source.

12. The apparatus of claim 11, wherein the light focusing device comprises: a downwardly extended section integrally formed on the scanning window toward the light source, comprising an end; a convex projection integrally formed on the end of the extended section, comprising a convex end surface confronting the light source; and a light collecting rim downwardly formed on the scanning window and around the extended section in a direction toward the light source.

* * * * *